United States Patent [19]

Disselbeck

[11] 4,416,780

[45] Nov. 22, 1983

[54] METHOD TO UPGRADE SEWAGE TREATMENT PLANTS OVERLOADED IN CONTINUOUS OPERATION

[75] Inventor: Dieter Disselbeck, Bad Soden, Fed. Rep. of Germany

[73] Assignee: Hoechst Aktiengesellschaft, Frankfurt am Main, Fed. Rep. of Germany

[21] Appl. No.: 329,080

[22] Filed: Dec. 9, 1981

Related U.S. Application Data

[63] Continuation of Ser. No. 969,842, Dec. 15, 1978, abandoned.

[30] Foreign Application Priority Data

Dec. 16, 1977 [DE] Fed. Rep. of Germany ....... 2756171

[51] Int. Cl.³ ................................................. C02F 3/04
[52] U.S. Cl. .................................. 210/617; 210/626; 210/631; 210/723
[58] Field of Search ............... 210/615, 616, 617, 618, 210/619, 631, 702, 723, 729, 150, 151, 195.3, 195.4, 199, 202, 203, 204, 205, 206, 220, 255, 261, 407, 484, 485, 626

[56] References Cited

U.S. PATENT DOCUMENTS

| | | | |
|---|---|---|---|
| 550,583 | 12/1895 | Brinckman | 210/484 |
| 1,985,435 | 12/1934 | Watson | 210/151 |
| 2,463,464 | 3/1949 | Lind | 210/150 |
| 3,397,139 | 8/1968 | Sak | 210/631 |
| 3,567,629 | 3/1971 | Ayers | 210/151 |
| 3,623,976 | 11/1971 | Cessna | 210/151 |
| 3,825,119 | 7/1974 | Rost | 210/150 |
| 4,057,496 | 11/1977 | Itagaki | 210/484 |

FOREIGN PATENT DOCUMENTS

| | | | |
|---|---|---|---|
| 2354917 | 5/1975 | Fed. Rep. of Germany | 210/631 |
| 500338 | 2/1939 | United Kingdom | 210/615 |

Primary Examiner—Ernest G. Therkorn
Attorney, Agent, or Firm—Hammond & Littell, Weissenberger and Muserlian

[57] ABSTRACT

A method to upgrade existing sewage treatment plants which become overloaded in long-term continuous operation by passing waste water or a part stream thereof through a filter device which is installed additionally prior and/or subsequent to at least one overloaded stage of the treatment plant. Thus method replaces preclarification, clearing, thickening and sludge dehydration steps for a part of waste water to be treated and also a part of the biological degradation by a simple purification process using the separated solids as an alluvial filter layer. A sewage treatment plant for waste water treatment by said method is described.

4 Claims, 3 Drawing Figures

METHOD TO UPGRADE SEWAGE TREATMENT PLANTS OVERLOADED IN CONTINUOUS OPERATION

PRIOR APPLICATION

This application is a continuation of U.S. patent application Ser. No. 969,842 filed Dec. 15, 1978, now abandoned.

A large number of older sewage treatment or purification plants currently in operation is overloaded. These plants no longer achieve the required purification capacity since the quantities of waste water have increased in relation to those on which the construction of the plant was based. Furthermore, many countries have decreed new statutory provisions for the purpose of protecting the environment which place higher requirements on the quality of sewage treatment and therefore necessitate further investment.

Conventional sewage treatment plants are generally based on sedimentation plants connected to apparatus for the biological treatment of the waste water. The biological treatment of the waste water may be effected in various ways, e.g. by circulation, air injection, trickling-filter treatment, etc. In these treatment methods it is important that the waste water comes into intimate contact with oxygen of the air and that the pollutants are thus decomposed biologically, usually by bacteria. A conventional process for purifying communal and industrial waste water consists of the steps of mechanical purification (preclarification), biological purification, subsequent clarification and sludge treatment. In the mechanical purification stage, impurities are removed by means of sieves, rakes, sand traps and/or by sedimentation in preclarifying tanks. In the biological step, colloids and dissolved materials are converted into a removable form by microorganisms and may be then separated off by sedimentation in a subsequent clarifying tank. The sludges with a high water content which are formed in the preclarification and subsequent clarification steps are treated by various methods in order to separate off excess water and stabilize the sludge ingredients, thereby to obtain a residue which can then be removed without endangering the environment.

Owing to the relatively slow process of sedimentation in the preclarifying and subsequent clarifying tanks, the removal of the sediment from the preclarification and subsequent clarification steps and the treatment of those sludges with high water contents in thickeners, drying beds, digestion towers, and by mechanical dehydration processes, etc., conventional clarifying plants are characterised by expensive treatment tanks and constructions, generally made from concrete.

Waste water from, for example, clearing and collecting tanks, presents another problem. It generally has the consistency of a thin sludge and has a high chemical oxygen demand (COD), for example, of up to 20,000 mg/l or more. It can only be processed by conventional methods at considerable expense; the problem of disposing of it in an environmentally safe way has hitherto remained unsolved. Thus, according to present practice, such waste water is used in agriculture or stored in sludge beds or the like.

For the reasons of water conversation, hygiene and odour this practice is subject to an increasing number of restritions.

Upgrading or—in other words—an improvement of efficiency of these sewage treatment plants in the hitherto conventional way generally necessitates expensive structural extension measures with the result that a relatively large area of land is required. Frequently, the land area available is not sufficient, so that the treatment plant has to be replanned, approved and built in another location.

We have now found it possible to upgrade existing sewage treatment plants which become overloaded in long-term continuous operation as a result of new requirements at comparatively small cost without far-reaching rebuilding measures and with a corresponding saving in the area of land required.

The problem may be solved by the fact that, instead of the sedimentation and biological decomposition operations conventionally used in sewage treatment, a more efficient and more adaptable special filtering method is employed before the overloaded treatment stage of existing sewage treatment plant.

Thus according to one aspect of the present invention there is provided a method to upgrade sewage treatment plants overloaded in long-term continuous operation wherein waste water or a part stream thereof is passed through a filter device of one or more suspended woven filter elements which is installed additionally to an overloaded treatment stage in at least one position being arranged in a manner selected from the group consisting of (1) prior to and (2) subsequent to said overloaded stage, thus forming a filter layer of alluvial solids along the fabric of the filter and thereby effecting removal of (a) solid particles, (b) colloidal components and (c) soluble components from the aqueous phase by means of gravity; the effluent filtrate or the combined part-stream-filtrate and crude waste water are then further treated in conventional manner.

This special filtering method includes reduction of the chemical and biological oxygen demands needed in connection with any further purification and comprises the steps of admixing at least a part stream of the waste water with one or more flocculating agents to effect agglomeration of the majority of the colloidal components and passing the resultant admixture under gravity through a fabric of a substantially uniform structure and located in a suspension device, thus at first continuously forming during the filtration process from the bottom of the filter device upwards (A) a combined filter along the fabric comprising (a) the fabric and (b) a primary filter layer of alluvial solids, thereby (B) to effect preclarification of the waste water, the removal of the solid particles and the colloidal components from the aqueous phase and reduction of the chemical and biological oxygen demands to an extent that is higher than that which is caused by the removal of the particles of the solids contained in the aqueous phase.

Thus, the process according to the invention, replaces the preclarification, clearing, thickening and sludge dehydration steps for a part of waste water to be treated, and also a part of the biological degradation, this latter essentially by removing the colloids by a simple purification process using the separated solids as an alluvial filter layer.

An object of the method according to the invention is therefore to adapt to the changed conditions and thus to upgrade sewage treatment plants in which at least one treatment stage is overloaded in continuous operation as a result of the increased quantities of waste water in relation to those on which construction of the plant was based and/or as a result of new statutory provisions which place higher requirements on the quality of the purified waste water, whereby existing sewage treatment plants may still be utilised and do not have to be replaced, for example, by new, larger plants. The aim of the invention is to modify, without a large investment, plants capable of operation-the operating capacity of a plant is governed by its design and lay-out-which originally satisfied purification requirements but have become overloaded in the course of time due to higher requirements, in such a way that the efficiency of these plants is increased and improved in relation to their original state.

This is possible by setting up prefabricated purifying plants according to the invention which do not require extensive underground structural work, being able to reduce the installation and running costs for plant purifying waste water. This also results in flexibility with regard to the choice of site and possibilities of expansion. Due to its compact construction the entire processing plant can be erected in the minimum space, and thus can be cheaply roofed, e.g. with flexible textile building materials.

With the filtering method of the invention, a treatment volume of only 0.2 to 1 m$^3$ of a preferably high-strength textile fabric is required for the treatment of each cubic/meter of waste water. The filter elements are suspended, that is, filtering is effected by means of gravity. Consequently, corresponding filter systems, e.g. prefabricated ready for assembly, may be installed above-ground and may be arranged, if required, over existing tanks. They may be extended by mechanical assembly techniques and may be adapted rapidly and flexibly to new requirements at any given time, which is not readily possible, for example, with reinforced concrete plants.

The filters used are prepared from such material which adsorbs the forces produced as the liquid is poured in. Generally, it is bag-shaped, especially in a cylindric form and may be suspended by means of a suspension device, for example, a supporting ring. After completion of the filtering operation it may be emptied downwardly, for example, via a closure present on the lower part of the filter. Generally, it has a capacity of at least 60 liters, preferably from 1 to 5 cubic meters. In principle it may be constructed from any material which will perform this function, including for example wire mesh. However, it is advantageous to use sack-like fabrics manufactured from man-made filaments or fibres which possess rot stability. Particularly suitable materials include those made from polyester fibres, such as polyethylene terephthtalate, polybutylene terephthalate, poly-1,4-dimethylolcyclohexane terephthalate or analogous products based on isophthalic acid; polyamides such as poly(hexamethylene adipate)polyhexamethylene sebacate, polyundecanoamide, polycaprolactam, and also poly-p-phenylene terephthalamine. Bags made from fibres of polyacrylonitrile, copolymers of acrylonitrile and at least one other monomer, the acrylonitrile content of which is at least 85%, polyvinyl chloride or polyolefins such as polyethylene or polypropylene are also suitable.

The fabric should conveniently not have too close a setting in the warp and weft directions, since if the setting is too close the throughput may be impaired. In the case of polyethylene terephthalate fibre with a titre of dtex 2200, a tread setting of 7.8 to 9.2, preferably 8.2 to 8.8 fibres per cm in the warp and weft directions is preferred. In the case of other yarn titres, the setting should be varied accordingly. If polyamide fabrics are used, the settings can be determined without any great difficulty taking into account the expansion characteristics of the polyamide. This correspondingly applies for fabrics made of other materials.

The filter device of the invention may be installed at the inlet of a sewage treatment plant and either the entire crude waste water or only a part stream thereof may be treated (see FIG. 1) in the device. The filter device of the invention enables the burden of treatment of the waste water delivered to any subsequent filtering apparatus to be reduced, depending on the load caoacity on the filters (1).

The surprising effect of the method according the invention appears to be due to the fact that not only are the removable solids and the majority of the colloidal substances separated off by the filtering means used according to the invention, but also a part of the genuinely dissolved substances are removed thereby, chiefly as a result of absorption or of adsorption processes.

Thus, the device may reduce the chemical oxygen demand (COD) and the biological oxygen demand (BOD) by 50-80% each and phosphate levels by 90-98%, and also enables the major part of the solids in the waste water to be separated. In this way, the purification requirements of the preliminary treatment stage (2) and the biological treatment stage (3), e.g. an activated-sludge or trickling-filter plant, are effectively relieved. The existing conventional plant is normally floowed by a post-treatment stage (4).

Waste water which may be treated according to the invention includes that containing both solid substances and colloidal substances and also genu nely dissolved material, and wherein the impurities are at least partly of an organic nature. The waste water generally has an average biological oxygen demand (BOD) of 250-300 mg/l. However, more contaminated waste water having a BOD of up to 12,000 mg/l or more and possibly having an increased solids content, such as waste water from clearing and collecting tanks, may also be treated by the process according to the invention.

The BOD can be regarded as a measurement of the content of organic substances in the waste water which are biologically degradably by microorganisms with a certain consumption of oxygen from the air. The COD constitutes a measurement for determining the amount of organic impurities, and in this case, the consumption of oxidising agents, e.g. potassium dichromate, is used as a basis for the measurement. Owing to the generally increased chemical reactivity of oxidising agents compared with microorganisms, the COD is generally higher than the BOD.

In the process according to the invention it is not necessary to add filtering agents, since the solids contained in the waste water are not removed by a separate preclarification step but serve to build up the active filter layer on the support fabric.

The method of the invention is suitable for the upgrading of older, e.g. municipal, sewage treatment plants which were designed, for example, for a BOD reduction of 80-85% relative to the untreated sewage. According to some current regulations a BOD of generally at most about 25 mg/l is required at the outlet, corresponding to a reduction of about 92% for an intake of municipal waste water commonly having a BOD of 300 mg/l. If the effeciency of such a treatment plant for e.g. 10,000 inhabitants is to be improved according to the invention, then e.g. a part stream of 50%, that is, approximately 50 m³/h of waste water, is supplied to filtering apparatus of the above-described type. For a load capacity of 5 m³/h per filter unit of 3 m in height and 1 m in diameter the BOD is reduced by approximately 70% corresponding to a quantity of suspended substances for which 210 kg of oxygen are required per day. The pollutants are removed in a highly concentrated solid form.

When the purified water is combined with the other half of the crude waste water, partly purified crude waste water is obtained with a BOD value of 195 mg/l. The subsequent treatment of this partly purified waste water in existing treatment plant leads to the required outlet BOD by utilisation of the comparatively high oxygen content of the filtered part stream. In this exemplary embodiment of the method according to the invention filtering apparatus comprising 10 filtering devices of the abovementioned dimensions are required to upgrade the said treatment plant. If a similar number of filters is provided so that alternating operation may be employed, the additional space required, including any flocculation station, amounts to only approximately 100 m². The space requirement may be further reduced if the new filtering apparatus is arranged over existing treatment tanks.

Another possibility to upgrade overloaded sewage treatment plants according to the invention consists in arranging the filtering apparatus after a biological treatment stage (see FIG. 2). Here, a substantial part of the activated-sludge flocculates is separated and concentrated, thus leading to effective relief of a pot-purification stage. A combination of a preliminary treatment stage and post-treatment stage is also possible.

A third possibility is the arrangement of the filtering apparatus at the outlet of an overloaded treatment plant (see FIG. 3).

In general, the filtering apparatus may be employed successfully whereever sedimentation occurs in the course of sewage treatment, whereby the suspended substance may be removed simply and quickly.

In all cases it is possible and often desired to supply to the filtering apparatus of waste water which has been treated by flocculating agents which include precipitating agents and/or flocculating auxiliaries and/or aluminum sulphate.

By such a treatment any phosphates in the waste water may also be largely removed, in addition to suspended particles, partly by adsorption on flocculated compounds, so that the risk of eutrophy of water of rivers and lakes is avoided, into which the purified water from the treatment plant is fed. This is of especial importance in the embodiment shown in FIG. 3. With such a treatment of the water discharged from the purification plant, the standards applicable to the discharged water for the main drainage channel may thus be more easily achieved.

Suitable flocculating agents include, for example: aluminum chloride and sulfate, ferric chloride, calcium hydroxide which may be advantageously combined with flocculating auxiliaries in a narrow sense such as polyacrylates or polyacrylamides. These flocculation agents cause substantially no contamination of the waste water. Conveniently quantities of from 1 to 450 g, or in the case of communal waste water preferably up to 150 g, in particular from 2 to 50 g and, in the case of waste water from clearing and collecting tanks, preferably 100 to 200 g of flocculating agent per cubic meter of water are sufficient for adequate flocculation. Generally quantities of flocculating agents towards the higher end of these ranges are used when the content of impurities in the waste water is high.

Preferably, the process and device of the invention may be extended by a step for preliminary flocculation of the solids contained in the waste water; or by subsequently treating the biologically treated filtrate in a physicochemical process step, for example, with the addition of conventional precipitating agents such as aluminum, iron and silicic acid compounds and either recycling the sludge thus obtained to the initial filtering stage or feeding the sludge to a separate apparatus.

The combined gravity filter used in the invention is provided with an outlet for the resulting dehydrated sludge may be connected to a device for subsequent mechanical dehydration of the sludge.

In the process according to the invention using the described filtering apparatus large quantities of waste water can be processed in a short time, for example, for waste water with a high solids content, it is possible to obtain throughput values of up to 1000 l/hour per m² of filter area. In the case of waste water with a low solids content, the throughput values may be even higher. Moreover, subsequent treatment of the filter, such as rinsing, etc., to remove any residual substances deposited, is not required.

Without using any further devices, it is possible to concentrate the solids to more than 15, preferably 20-25% and possibly up to 30% of dry substances in this stage. Less concentrated sludge may thereafter be concentrated in an additional separate filter. If a filter with a higher solids content is desired, the sludge contained in the alluvial filter may be subjected to a further process step, comprising subsequent mechanical dehydration in, e.g. a vertically operating drainage press or a rotary vacuum filter, thereby being dehydrated until the desired solids content of e.g. more than 35% is obtained.

Figure 1:
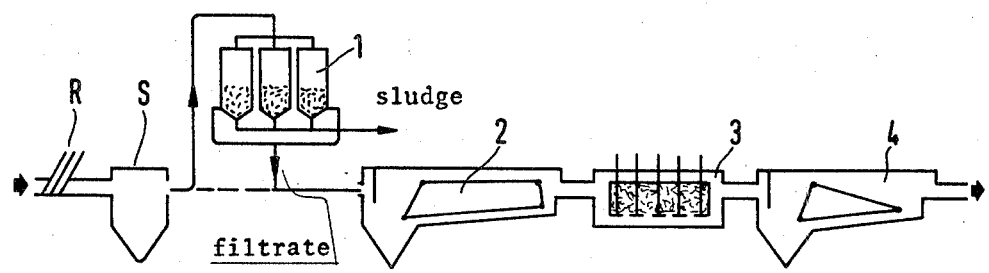
FIG. 1 shows an embodiment of the invention with a suspended filtering device placed before a settling tank for preliminary purification.
Figure 2:
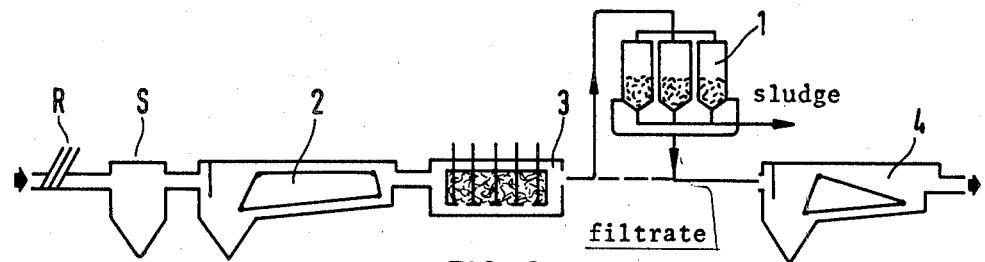
FIG. 2 shows an embodiment of the invention with a suspended filtering device placed before a settling tank for post-treatment.
Figure 3:
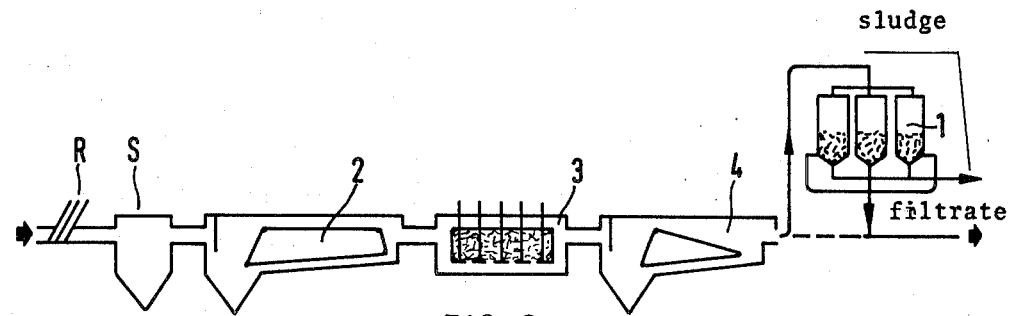
FIG. 3 show an embodiment of the invention with a suspending filtering device placed after a settling tank for post-treatment.

In the accompanying drawings, the letters and numerals indicating parts of the plant have the following meanings:

R = rake, S = sand trap, 1 = filtering apparatus,
2 = settling tank for preliminary purification,
3 = activated-sludge or trickling-filter system,
4 = settling tank for post-treatment.

According to a further embodiment of the invention it is possible to modify the filter elements, by means of which partial treatment of the waste water is effected, in such a way that the filtrate emerging through a filter wall is passed through a large-area element acting as a biological filter and by this manner partial biological treatment is carried out therein. Such modified filters may be designed so that the gravity filter and the biological filter are combined in one structural element. We have found that the filtrate, which partly runs along the outer wall as a thin film and partly emerges through the wall in the form of thin jets, is enriched with oxygen almost to saturation point due to its fine distribution as it emerges from the filter element. Thus, for example with a water temperature of 17° C. an oxygen content of 8-9 mg/l has been found, although the waste water supplied to the filter had an oxygen content of only 1.5-2 mg/l. This enrichment of the filtrate with oxygen, brought about by the special type of filtering operation, and the resultant large surface area of the filtrat are therefore utilised for the biological treatment of the filtrate in general and particularly according to this special embodiment. There are then formed on the faces of the biological filter, a biological substrate which causes partial decomposition of the remaining pollutants dissolved in the filtrate, the oxygen required for the purpose being taken from the air. With this combined gravity and biological filter the biological filters are preferably arranged as large surface area of plastics elements, e.g. plastics trickling filters, in a circle, an oval or a rectangle around the fabric filters. They may also consist of bulk materials with a large surface area such as pumice, lava or a plastics granulate. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

I claim:

1. A method of increasing the capacity of an existing sewage treatment plant comprising passing by means of gravity at least a portion of waste water through a filter device arranged (1) prior to or (2) subsequent to or (3) prior and subsequent to a conventional treatment stage of said sewage treatment plant stage, said filter device being at least one suspended, tube-like woven fabric filter element and an inner filter layer of solids resulting from solids separated during the filtration process from the waste water along the woven fabric filter thus water passes through the filter wall while separating by and in the filter layer (a) solid particles, (b) colloidal components and (c) soluble components to obtain a effluent filtrate with an increased oxygen content.

2. A method as claimed in claim 1 wherein the filtrate emerging through the wall of said filter is passed through a large-area element acting as a biological filter, thus effecting partial biological treatment of the filtrate.

3. A method as claimed in claim 1 wherein the treatment stage is a preclarification, a biological purification or a post-clarification stage.

4. A method as claimed in claim 1 wherein the waste water is pretreated with flocculating agents or a combination of precipitating agents and flocculating auxiliaries.

* * * * *